United States Patent [19]
Szekely

[11] Patent Number: 5,861,452
[45] Date of Patent: Jan. 19, 1999

[54] SCRATCH AND SCUFF RESISTANT POLYMER

[75] Inventor: Peter Laszlo Szekely, Gex, France

[73] Assignee: E. I. du Pont de Nemours and Company, Wilmington, Del.

[21] Appl. No.: 45,618

[22] Filed: Mar. 20, 1998

[51] Int. Cl.⁶ .............................. C08K 5/02; C08F 20/00
[52] U.S. Cl. ..................... 524/462; 525/437; 525/444; 525/445; 524/539; 524/543; 524/565
[58] Field of Search ..................................... 525/437, 444, 525/445; 524/462, 539, 543, 565

[56] References Cited

U.S. PATENT DOCUMENTS 3,766,146  10/1973  Witsiepe .
4,725,481   2/1988  Ostapchenko ........................... 428/213

*Primary Examiner*—Samuel A. Acquah

[57] ABSTRACT

The present invention relates to a scratch resistant polymer composition having a polymer that includes a copolyether-ester elastomer, said polymer having a hardness of from 25D to 82D, and a fluorosurfactant having a nonionic organic head and a tail of the formula $CF_3-(CF_2)_x-CH_2CH_2$, where x is an integer from 3 to 15.

8 Claims, No Drawings

SCRATCH AND SCUFF RESISTANT POLYMER

BACKGROUND

1. Field of the Invention

This invention relates to the field of polymers, and specifically polymers that include at least one copolyetherester elastomer.

2. Description of the Related Art

Copolyetherester elastomers and methods for their preparation are known in the art. Copolyetherester elastomers combine many of the most desirable characteristics of high-performance elastomers and flexible plastics.

Copolyetherester elastomers are block polymers that include a hard, or crystalline, segment and a soft, or amorphous, segment based on long-chain polyether glycols. Properties are determined by the ratio of soft segments and by the makeup of these segments.

These elastomers also feature exceptional toughness and resilience; high resistance to creep, impact and flex fatigue; flexibility at low temperatures; and good retention of properties at elevated temperatures.

Copolyetherester elastomers may be readily formed into high-performance products by a variety of thermoplastic processing techniques, including injection molding, extrusion, blow molding, rotational molding and melt casting.

A problem with molded parts made from copolyetherester elastomers sometimes arises when those molded parts are subjected to a scratching or scuffing force in that those forces leave visible scratches or scuff marks on the surface of the molded part. These scratches and scuff marks are undesirable when the molded part is visible in normal use, such as when the molded part is an air bag deployment door or dashboard of an automobile.

What is necessary, therefore, is a polymer composition that includes a copolyetherester elastomer and that is resistant to scratching and scuffing.

SUMMARY OF THE INVENTION

The present invention relates to a scratch resistant polymer composition having a polymer that includes a copolyetherester elastomer, said polymer having a hardness of from 25D to 82D, and a fluorosurfactant having a nonionic organic head and a tail of the formula $CF_3—(CF_2)_x—CH_2CH_2$, where x is an integer from 3 to 15.

DETAILED DESCRIPTION

The present invention relates to a scratch resistant polymer composition having (a) from 99 to 99.9 weight percent of a polymer that includes a copolyetherester elastomer, said polymer having a hardness of from 25D to 82D, and (b) from 0.1 to 1 weight percent of a fluorosurfactant having a nonionic organic head and a tail of the formula $CF_3—(CF_2)_x—CH_2CH_2$, where x is an integer from 3 to 15, based on the total weight of (a) and (b) only.

The polymer of the present invention includes a copolyetherester elastomer or a mixture of two or more copolyetherester elastomers. Optionally, the polymer may also include polystyrene, polyethylene terephthalate, polybutylene terephthalate, acrylonitrile butadiene styrene, styrene acrylonitryle, polycarbonate, polypropylene modified with ethylene-propylene-diene terpolymer (EPDM), or mixtures thereof. The copolyetherester elastomer should be present in the polymer in an amount of at least 30 weight percent.

By "copolyetherester elastomer" or "a mixture of two or more copolyetherester elastomers" is meant a copolyetherester elastomer such as is disclosed in U.S. Pat. Nos. 3,766,146, 4,014,624 and 4,725,481. These patents disclose a segmented thermoplastic copolyetherester elastomer containing recurring polymeric long chain ester units derived from carboxylic acids and long chain glycols and short chain ester units derived from dicarboxylic acids and low molecular weight diols. The long chain ester units form the soft segment of the copolyetherester elastomer, and the short chain ester units form the hard segment.

More specifically, such copolyetherester elastomers may comprise a multiplicity of recurring intralinear long chain and short chain ester units connected head-to-tail through ester linkages, said long chain ester units being represented by the formula:

and said short-chain ester units being represented by the formula:

wherein:

G is a divalent radical remaining after removal of terminal hydroxyl groups from poly(alkylene oxide) glycols having a carbon to oxygen ratio of about 2.0–4.3, a molecular weight above about 400 and a melting point below about 60° C.;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250.

It is preferred that the short chain ester units constitute about 15–95% by weight of the copolyester and at least about 50% of the short chain ester units be identical.

The term "long chain ester units" as applied to units in a polymer chain refers to the reaction product of long chain glycol with a dicarboxylic acid. Such "long chain ester units", which are a repeating unit in the copolyesters, correspond to the formula (I) above. The long chain glycols are polymeric glycols having terminal (or as nearly terminal as possible) hydroxyl groups and a molecular weight above about 400 and preferably from about 400–4000. The long chain glycols used to prepare the copolyesters are poly (alkylene oxide) glycols having a carbon to oxygen ratio of about 2.0–4.3. Representative long chain glycols are poly (1,2- and 1,3-propylene oxide) glycol, poly(tetramethylene oxide) glycol, random or block copolymers of ethylene oxide and 1,2-propylene oxide.

The term "short chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by formula (II) above.

Included among the low molecular weight diols which react to form short chain ester units are acyclic, alicyclic and aromatic dihydroxyl compounds, an example of which is 1,4-butanediol. Dicarboxylic acids which are reacted with the foregoing long chain glycols and low molecular weight diols to produce the copolyesters of this invention are aliphatic, cycloaliphatic or aromatic dicarboxylic acids of low molecular weight, that is, having a molecular weight of less than about 300, an example of which is terephthalic acid.

The polymer of the invention has a hardness of from 25D to 82D. As used herein, the term "hardness" means the hardness of a polymer as determined by International Standard ISO 868-1978(E). The hardness measured by this Standard is also known as "Shore hardness". Hardness measurements according to this standard are followed by either the letter A or D to indicate whether a type A or type D Shore durometer was used to make the hardness measurement.

The scratch resistant polymer composition also includes from 0.1 to 1 weight percent of a fluorosurfactant. Fluorosurfactants are anionic, nonionic or cationic fluoro alkyl compounds that have extremely low surface tension and are used as wetting, emulsifying and dispersing agents. The fluorosurfactant according to the present invention has a nonionic organic head and a tail of the formula $CF_3$—$(CF_2)_x$—$CH_2CH_2$, where x is an integer from 3 to 15. The nonionic organic head may be an alkenyl or a compound of the formula (O—$CH_2$—$CH_2$)$_y$—OH, where y in an integer from 1 to 10. Further, the fluorosurfactant may be present in a solvent system, such as an ethylene glycol/water solvent system.

The fluorosurfactant is normally present in the form of a viscous liquid, and may be added to the polymer using any conventional method,, such as directly injecting the fluorosurfactant into a compounding machine that includes the polymer.

The weight ranges for the inventive polymer given above based on the total weight of (a) a polymer that includes a copolyetherester elastomer and (b) a fluorosurfactant having a nonionic organic head and a tail of the formula $CF_3$—$(CF_2)_x$—$CH_2CH_2$, where x is an integer from 3 to 15, based on the total weight of (a) and (b) only.

The polymer may be compounded with antioxidant stabilizers, ultra-violet stabilizers, hydrolysis stabilizers, dyes or pigments, fillers such as mineral fillers, antimicrobial reagents, and the like.

EXAMPLES

In the following examples, various polymer compositions were tested for scratch resistance and scuffing resistance. The results of these examples are summarized in Tables 1–5 below.

The polymer composition included a copolyetherester elastomer, carbon black and a fluorosurfactant. Carbon black was added to make the molded polymer black, and which made it easier to detect scratches and scuffs in the molded polymer.

In each example the polymer composition was prepared by preblending pellets of the copolyetherester elastomer with a fluorosurfactant. The preblended pellets were combined with additional copolyetherester elastomer pellets in a compounder and were compounded into a molten resin. The molten resin was cooled in a water bath and cut into pellets. The pellets were then dried to reduce the moisture content to below 0.1 weight percent. The dried pellets were injection molded to form a plate that had both a glossy surface and a mat surface. The mat surface had a texture roughness that corresponded to Charmilles 12 with a roughness number Ra of 0.4 microns.

The fluorosurfactants used in the examples according to the invention were Zonyl® FSO 100 and Zonyl® 8857A, available from DuPont. Zonyl® FSO 100 is a non ionic fluorosurfactant having a tail of the formula $CF_3$—$(CF_2)_x$—$CH_2CH_2$, where x is an integer from 3 to 15 and a head of the formula (O—$CH_2$—$CH_2$)$_y$—OH, where y in an integer from 1 to 10. The Zonyl® FSO 100 is present in a concentration of 50 percent in an ethylene glycol/water solvent system. Zonyl® 8857A is a non ionic fluorosurfactant having a tail of the formula $CF_3$—$(CF_2)_a$—$CH_2CH_2$, where a is an integer from 3 to 15 and an alkenyl head. There was no solvent present in Zonyl® 8857A.

Scratch resistance of both the glossy and mat surfaces of the molded plate was measured by a modified ISO 1518 test using an Erichsen scratch tester. The ISO 1518 standard is a test for scratching paint where a pin is subjected to a load and then placed in contact with a painted surface where the pin is dragged on the surface at a constant speed of 30 millimeters per second. The same test procedure was used for these examples except that a molded plate was used in place of a painted surface. The pin was subjected to higher and higher loads until the surface of the molded plate was scratched, at which point the load was recorded. While higher loads on the pin caused deeper grooves in the molded plate, the plate was considered to be scratched only when the load on the pin was high enough to cause microcutting on the plate visible to the naked eye, that is, when cuts perpendicular to the axis of the scratch line were formed in the surface of the plate.

Scuffing resistance of both the glossy and mat surfaces of the molded plate was measured by the following method. A measuring device was used that included a horizontal table supporting the molded plate; a vertical cylinder supporting an horizontal arm able to have a rotational motion around the cylinder; a vertical pin having a total weight of about 295 grams fixed a the free end of the horizontal arm, the pin having a cylindrical shape with a diameter of 1.2 mm with rounded edge, and an angular displacement limited at both ends by a block; and a cylindrical spring made of steel having a stiffness of about 0.2N/mm. This spring was fixed between the free end of the horizontal arm and one end of the block, and was used to move the vertically-loaded pin with a constant force. The angular motion speed of the pin depended of the friction coefficient of the material of the molded plate.

The scuffing resistance of the molded plate was measured as follows. The molded plate of the material to be tested was fixed onto the horizontal table, and the loaded pin was attached to the horizontal arm so that there was no contact between the plate and the tip of the pin. The horizontal arm was rotated to the maximum angle possible, to give the maximum force from the spring according the limited angular displacement of this arm. The loaded pin was placed in contact with the test plate and then the arm holding the pin was released and the force exerted by the spring allowed the pin to follow an angular displacement on the surface of the molded plate to scuff the surface of the molded plate.

The angular motion of the loaded pin produced a visible scuffing line on the surface of the test plate, depending on the weight of the pin. The load on the pin was adjusted to give invisible scuffing line on a reference material defined as the target material. The constant value of load should give a visible scuffing line on the material to be improved as far as scratch resistance is concerned.

The scale of scuffing resistance in Table 1 is rated in a range of from 0 to 5, where 0 represents no or an invisible scuffing line, and 5 represents a significant amount of scuffing.

COMPARATIVE EXAMPLE 1 AND EXAMPLES 2–5

In Comparative Example 1, a polymer composition was made using 0.4 weight percent carbon black and 99.6 weight percent of copolyetherester elastomer having a hard segment of 4-glycol terephthalate (4GT) and a soft segment of polypropylene glycol (PPG) and a hardness of 35D. The elastomer is sold by DuPont under the trademark Hytrel® G3548L.

In Examples 2 and 3 a polymer composition was made as in Comparative Example 1 using 0.4 weight percent carbon black, except that the composition also included Zonyl® FSO 100 fluorosurfactant. In Examples 4 and 5 a polymer composition was made as in Examples 2 and 3 except that the composition included Zonyl® 8857A fluorosurfactant.

The results of these examples showed that the compositions in Examples 2–5 all showed an increase in scratch resistance compared to the composition in Comparative Example 1. Similarly, all the compositions in these examples, except for the glossy side of the molded plate of example 2, all showed an increase in scuffing resistance compared to the composition in Comparative Example 1.

COMPARATIVE EXAMPLE 6 AND EXAMPLES 7–8

Compositions were made as in the previous Comparative Example 1 and examples 4–5 except that the polymer had a hardness of 55D. The elastomer is sold by DuPont under the trademark Hytrel® G5544.

The results of these examples showed that the compositions in Examples 7–8 all showed a significant increase in both scratch resistance and scuffing resistance compared to the composition in Comparative Example 6.

COMPARATIVE EXAMPLES 9 AND EXAMPLES 10–11

Compositions were made as in the previous Comparative Example 1 and Examples 4–5 except that the polymer used was a copolyetherester elastomer having a hard segment of 4GT and a soft segment of polytetra methylene ether glycol (PTMEG) and a hardness of 55D. The elastomer is sold by DuPont under the trademark Hytrel® 5556.

The results of these examples showed that the compositions in Examples 10–11 all showed an increase in both scratch resistance, and scuffing resistance on the mat side of the molded plate, compared to the composition in Comparative Example 9.

COMPARATIVE EXAMPLES 12 AND EXAMPLES 13–14

Compositions were made as in the previous Comparative Example 1 and Examples 4 and 5 except that the polymer used was a copolyetherester elastomer having a hard segment of 4GT and a soft segment of PTMEG and a hardness of 72D. The elastomer is sold by DuPont under the trademark Hytrel® 7246.

The results of these examples showed that the compositions in Examples 13–14 showed an increase in scratch resistance when the surface of the molded plate was glossy.

COMPARATIVE EXAMPLES 15 AND EXAMPLES 16–17

Compositions were made as in the previous Comparative Example 1 and Examples 2 and 4 except that the polymer had a hardness of 40D. The elastomer is sold by DuPont under the trademark Hytrel® G4044.

The results of these examples showed that the compositions in Examples 16–17 showed an increase in both scratch resistance and scuffing resistance compared to the compositions in Comparative Example 15.

TABLE 1

| Ex. No. | Fluorosurfactant | wt. % | Scratch Resistance[1] (N) GLOSSY | MAT | Scuffing Resistance[2] AT GATE GLOSSY | MAT | AT END GLOSSY | MAT |
|---|---|---|---|---|---|---|---|---|
| C1 | None |  | 8 | 9 | 5 | 5 | 5 | 5 |
| 2 | Zonyl ® FSO100 | 0.3 | 12 | 12 | 5 | 2 | 5 | 2 |
| 3 | Zonyl ® FSO100 | 0.6 | 13 | 13 | 0.5 | 0.5 | 0.5 | 0.5 |
| 4 | Zonyl ® 8857A | 0.1 | 13 | 11 | 4 | 1 | 4 | 0.5 |
| 5 | Zonyl ® 8857A | 0.3 | 14 | 14 | 0.5 | 0.5 | 0.5 | 0.5 |
| C6 | None |  |  | 9 | 3 | 2 | 3 | 2 |
| 7 | Zonyl ® 8857A | 0.1 | 20− | 19 | 0 | 0.5 | 0 | 0 |
| 8 | Zonyl ® 8857A | 0.3 | 20+ | 20 | 0.5 | 0 | 0.5 | 0 |
| C9 | None |  | 12 | 12 | 0 | 3 | 0.5 | 3 |
| 10 | Zonyl ® 8857A | 0.1 | 19 | 20 | 0 | 0.5 | 0.5 | 0.5 |
| 11 | Zonyl ® 8857A | 0.3 | 19 | 20 | 0.5 | 0.5 | 0.5 | 0.5 |
| C12 | None |  | 10 | 18 | 0.5 | 0.5 | 0.5 | 1 |
| 13 | Zonyl ® 8857A | 0.1 | 17 | 18 | 0.5 | 1 | 0.5 | 0.5 |
| 14 | Zonyl ® 8857A | 0.3 | 17 | 18 | 0.5 | 1 | 0.5 | 0.5 |
| C15 | None |  | 5 | 8 | 5 | 5 | 5 | 5 |
| 16 | Zonyl ® FSO100 | 0.3 | 15 | 14 | 0 | 1 | 0 | 1 |
| 17 | Zonyl ® 8857A | 0.1 | 16 | 14 | 0 | 1 | 0.5 | 1 |

[1]Force on pin required to produce scratching.
[2]0 represents no or an invisible scuffing line, and 5 represents a significant amount of scuffing

COMPARATIVE EXAMPLES 18 AND EXAMPLES 19–20

In Comparative Example 18 the physical properties of the composition of Comparative Example 15 was measured, and in Examples 19 and 20 the physical properties of the composition of Examples 16 and 17 were measured. The results of these examples, summarized in Tables 2–5 below, showed that the addition of the fluorosurfactant does not adversely affect the physical properties of the polymer composition.

The data for stress, strength and strain were all measured according to ISO 527, and the data for tear strength were measured according to ISO 34A. The data for shrinkage in Table 5 were measured as follows: a molded plate was made under standard molding conditions and was kept at room temperature for 24 hours. Then the length of the plate was measured in both the in-flow and cross-flow directions, and this length was compared to the length of the mold cavity in the in-flow and cross-flow directions. "In-flow" direction means along the direction of flow of resin into the mold, and "cross-flow" direction means perpendicular to the direction of flow of resin into the mold.

TABLE 2

| | Tensile Properties at +23 C | | | |
|---|---|---|---|---|
| Ex. No. | Stress @ 10% strain (MPa) | Strength @ break (MPa) | Strain at break (%) | Tear Strength (N/mm) |
| C18 | 4 | 21 | >500 | 47 |
| 19 | 4.3 | 19.2 | >500 | 50 |
| 20 | 4.3 | 20.3 | >500 | 47 |

TABLE 3

| | Tensile Properties at −40 C | | | |
|---|---|---|---|---|
| Ex. No. | Stress @ 10% strain (MPa) | Strength @ break (MPa) | Strain at break (%) | Tear Strength (N/mm) |
| C18 | 20.1 | 29 | 210 | 145 |
| 19 | 16.6 | 26.4 | 180 | 140 |
| 20 | 14.5 | 26.5 | 180 | 150 |

TABLE 4

| | Tensile Properties at +85 C | | |
|---|---|---|---|
| Ex. No. | Stress @ 10% strain (MPa) | Strength @ break (MPa) | Strain at break (%) |
| C18 | 2.5 | 12 | >500 |
| 19 | 2.6 | 11.9 | >500 |
| 20 | 2.9 | 12 | >500 |

TABLE 5

| Example No. | shrinkage in flow (%)/ cross flow (%) |
|---|---|
| C18 | 0.8/1.0 |
| 19 | 0.7/0.9 |

I claim:

1. A scratch resistant polymer composition comprising (a) from 99 to 99.9 weight percent of a copolyetherester elastomer having a hardness of from 25D to 82D (b) from 0.1 to 1 weight percent of a fluorosurfactant having a nonionic organic head and a tail of the formula $CF_3$—$(CF_2)_x$—$CH_2CH_2$, where x is an integer from 3 to 15, based on the total weight of (a) and (b) only.

2. The polymer composition of claim 1, wherein the head of the fluorosurfactant is a compound of the formula (O—$CH_2$—$CH_2$)$_y$—OH, where y in an integer from 1 to 10.

3. The polymer composition of claim 1, wherein the head of the fluorosurfactant is an alkenyl compound.

4. The polymer composition of claim 1, wherein the polymer composition further comprises polystyrene, polyethylene terephthalate, polybutylene terephthalate, acrylonitrile butadiene styrene, styrene acrylonitryle, polycarbonate, polypropylene modified with ethylene-propylene-diene terpolymer, or mixtures thereof.

5. A molded article made from the composition of claim 1.

6. A molded article made from the composition of claim 2.

7. A molded article made from the composition of claim 3.

8. A molded article made from the composition of claim 4.

* * * * *